United States Patent
Xing et al.

(10) Patent No.: US 8,774,369 B2
(45) Date of Patent: Jul. 8, 2014

(54) METHOD AND SYSTEM TO PROVIDE PRIORITY INDICATING CALLS

(71) Applicants: Bo Xing, Fremont, CA (US); Yi-Pin Eric Wang, Fremont, CA (US)

(72) Inventors: Bo Xing, Fremont, CA (US); Yi-Pin Eric Wang, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/658,744

(22) Filed: Oct. 23, 2012

(65) Prior Publication Data

US 2014/0112457 A1    Apr. 24, 2014

(51) Int. Cl.
| | |
|---|---|
| *H04M 1/24* | (2006.01) |
| *H04M 3/08* | (2006.01) |
| *H04M 3/22* | (2006.01) |
| *H04M 1/64* | (2006.01) |
| *H04M 11/00* | (2006.01) |

(52) U.S. Cl.
USPC ............ 379/32.04; 379/88.08; 379/88.11; 379/88.18; 379/88.26; 379/208.01

(58) Field of Classification Search
USPC ........... 379/32.01, 32.04, 88.19, 88.2, 88.21, 379/93.17, 93.23, 142.01, 142.04, 142.05, 379/142.17, 352, 354, 373.01, 373.02, 379/376.01, 88.08, 88.11, 88.12, 88.18, 379/88.22, 88.23, 88.25, 88.26, 207.11, 379/208.01, 210.03
See application file for complete search history.

(56) References Cited

U.S. PATENT DOCUMENTS

| | | | | |
|---|---|---|---|---|
| 5,550,911 | A | * | 8/1996 | Bhagat et al. ............ 379/221.11 |
| 5,805,675 | A | * | 9/1998 | Chanda ...................... 379/93.14 |
| 6,041,103 | A | * | 3/2000 | La Porta et al. .............. 379/67.1 |
| 6,104,913 | A | * | 8/2000 | McAllister ................... 455/41.1 |
| 6,185,288 | B1 | * | 2/2001 | Wong ............................. 379/219 |
| 6,625,143 | B1 | * | 9/2003 | Kamiya et al. ................ 370/360 |
| 6,768,792 | B2 | * | 7/2004 | Brown et al. ............ 379/207.14 |
| 6,795,541 | B2 | * | 9/2004 | Oren ........................ 379/207.08 |
| 7,477,730 | B2 | * | 1/2009 | Starbuck et al. ............ 379/88.12 |
| 2003/0112949 | A1 | * | 6/2003 | Brown et al. ............ 379/207.14 |
| 2004/0028204 | A1 | * | 2/2004 | Crook ....................... 379/211.01 |
| 2005/0152515 | A1 | * | 7/2005 | Amir et al. ................. 379/88.13 |
| 2008/0089509 | A1 | * | 4/2008 | Wuthnow et al. ........ 379/374.03 |
| 2009/0003541 | A1 | * | 1/2009 | Hilt et al. ................... 379/88.12 |

OTHER PUBLICATIONS

Bo Xing et al., "Network Nodes Providing Pre-Call and During Call Advertising," U.S. Appl. No. 13/461,535, filed May 1, 2012, 36 pages.

* cited by examiner

*Primary Examiner* — Binh Tieu
(74) *Attorney, Agent, or Firm* — Blakely Sokoloff Taylor & Zafman, LLP (57) ABSTRACT

A method implemented to provide voice calls in a network. The method comprises receiving a voice call initiation request at a caller agent, wherein the voice call initiation request is triggered by a caller initiating a voice call via a caller equipment, wherein the voice call is destined to a callee equipment communicatively coupled with the network to reach a caller, and wherein the caller agent and a callee agent interact with the caller equipment and the callee equipment respectively. The method further comprise sending a call connection message to the caller equipment, receiving an acknowledgment message from the caller equipment, and opening a voice channel between the caller and the caller agent without waiting for a callee agent response.

22 Claims, 10 Drawing Sheets

METHOD AND SYSTEM TO PROVIDE PRIORITY INDICATING CALLS

FIELD OF INVENTION

The embodiments of the invention are related to the field of telephony networking. More specifically, the embodiments of the invention relate to a method and system for providing voice calls in telephony networks.

BACKGROUND

A telephone call process has largely remained the same for years despite tremendous progress in telephony networking technologies and telephony equipment. In a typical telephone call, a caller dials a telephone number of a callee (also named called party, or call recipient), and a voice channel is established between the caller and the callee once the callee picks up the telephone. If the callee does not pick up the telephone, a voice channel is established between the caller and the callee's voice mail when voice mail is enabled. However, there is not a good way for the callee to determine the importance or urgency of an incoming telephone call before the callee picks up the telephone or listens to the voice mail.

Figure 1:
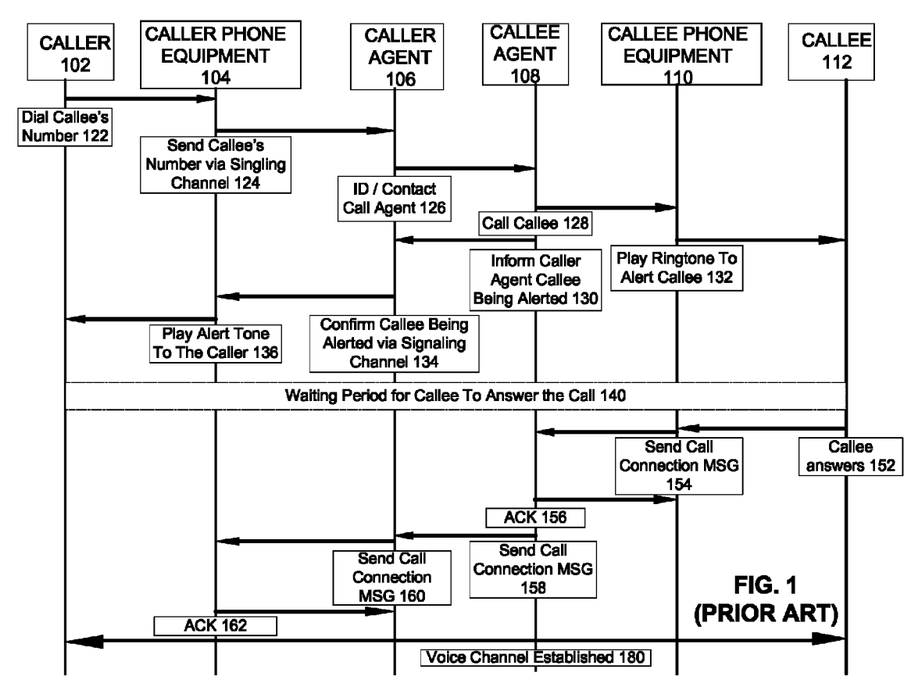
FIG. 1 is a block diagram illustrating a telephone call process known to persons skilled in the art.

FIG. 1 is a block diagram illustrating a telephone call process known to persons skilled in the art. A caller, caller 102 tries to reach a callee, callee 112. Caller dials the callee's telephone number using caller phone equipment 104 at reference 122. Caller phone equipment 104 then sends callee's number via a signaling channel at reference 124 to caller agent 106. Caller agent 106 then identifies the callee's telephone number and contact a callee agent 108 associated with the callee number. Caller agent 106 and callee agent 108 are switch centers close to the caller/callee locations and responsible for establishing communication with another party on behalf of the caller/callee. Callee agent 108 then calls callee via signaling channel to callee phone equipment 110 at reference 128. Callee agent 108 also informs caller agent 106 that callee 112 is being alerted at reference 130. Callee phone equipment 110 then plays ringtone to alert callee 112 at reference 132. Caller agent 106 confirms that callee 112 has been alerted via a signaling channel at reference 134. Caller phone equipment 104 then play alert tone to caller 102 at reference 136. Afterward, caller 102 waits for callee 112 to answer the call at waiting period for callee to answer the call at reference 140. Note the waiting period 140 is the period after reference 136 and before reference 152. Callee 112 answers callee phone equipment 110 at reference 152. Callee phone equipment 110 sends callee agent 108 a connection message at reference 154. Callee agent 108 acknowledges the call connection message at reference 156, and callee agent 108 sends call a connection message to caller agent 106 at reference 158. Caller agent 106 in turn sends a call connection message to caller phone equipment 104 at reference 160. Caller phone equipment 104 sends caller agent 106 an acknowledgement at reference 162. Then a voice channel between caller 102 and callee 112 is established at reference 180.

SUMMARY

A method to provide voice calls in a network that starts with receiving a voice call initiation request at a caller agent, where the voice call initiation request is triggered by a caller initiating a voice call via a caller equipment, where the voice call is destined to a callee equipment communicatively coupled with the network to reach a caller, and where the caller agent and a callee agent interact with the caller equipment and the callee equipment respectively. Afterward, a call connection message is sent to the caller equipment. After an acknowledgment message is received from the caller equipment, a voice channel between the caller and the caller agent is opened without waiting for a callee agent response.

A network element configured as a caller agent to provide voice calls in a network. The caller agent comprises an incoming call processor configured to receive a voice call initiation request, where the voice call initiation request is triggered by a caller initiating a voice call via a caller equipment, where the voice call is destined to a callee equipment communicatively coupled with the network to reach a caller, and where the caller agent and a callee agent interact with the caller equipment and the callee equipment respectively; a communication module configured to send a call connection message to the caller equipment, and where the communication module is further configured to receive an acknowledgment from the caller equipment; and a call setup processor configured to open a voice channel between the caller and the caller agent without waiting for a callee agent response.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flow diagram will be described with reference to the exemplary embodiment of FIGS. 7-10. However, it should be understood that the operations of flow diagrams can be performed by embodiments of the invention other than those discussed with reference to FIGS. 3-6, and the embodiments discussed with reference to FIGS. 7-10 can perform operations different than those discussed with reference to the flow diagrams of FIGS. 3-6.

As used herein, a network element (e.g., a router, switch, bridge, caller agent, callee agent, call processor) is a piece of networking equipment, including hardware and software that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

Figure 2:
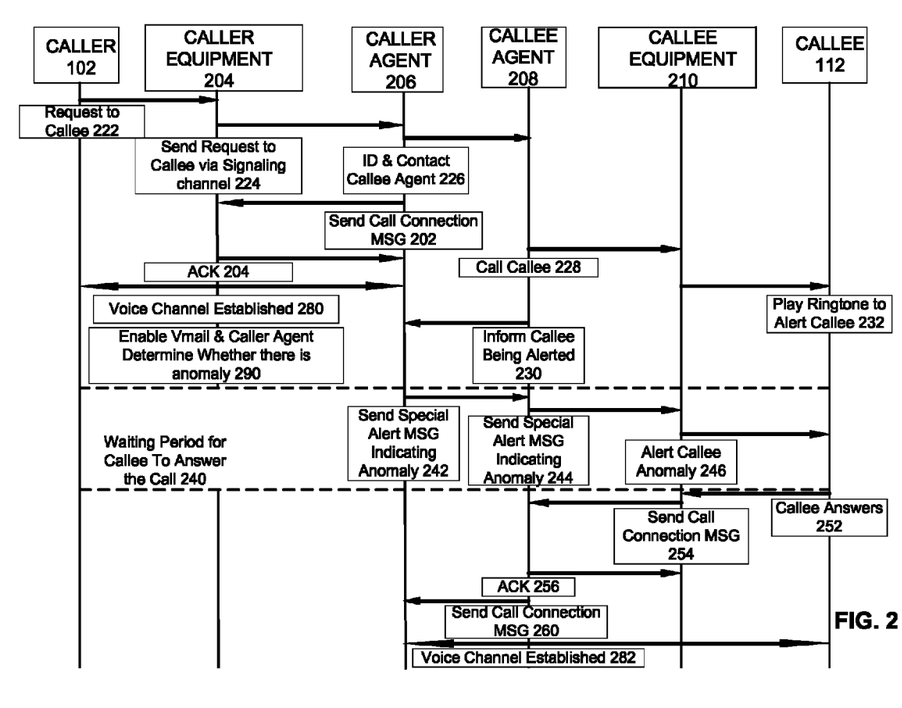
FIG. 2 is a block diagram illustrating a priority indicating call process according to one embodiment of the invention.

FIG. 2 is a block diagram illustrating a priority indicating call process according to one embodiment of the invention. In this specification, a priority indicating call is a caller initiated telephone call that can establish a voice channel without a callee agent response. As discussed in detail herein below, a priority indicating call addresses shortcomings of regular calls. FIG. 2 is similar to FIG. 1 and same or similar references indicate elements or components having the same or similar functionalities. In the call process, caller 102 tries to reach callee 112 through a priority indicating call. Caller 102 sends a request to callee 112 for a priority indicating call at reference 222 and the request goes to caller equipment 204. In one embodiment, the request for a priority indicating call to a callee may be a number representing the callee (e.g., a callee's telephone number) and a set of one or more additional characters. By adding a set of one or more additional characters, caller 102 indicates to caller equipment 204 that the request is not for a regular telephone call to the indicated callee, but a priority indicating call to the callee. For example, the set of one or more additional characters can be "#," or a "#" followed by a special suffix. In another embodiment, the request for a priority indicating call to a callee may be a number representing the callee (e.g., a callee's telephone number) only. In that case, all calls from caller 102 to callee are considered priority indicating calls, so that priority indicating call is enabled by default. Priority indicating call may be enabled for a variety of reasons. For example, a caller may be an outpatient, a minor or a senior that requires special attention, thus priority indicating call is enabled for them. Caller equipment 204 may be a wireline telephone, a cellular telephone, or a set of equipment enabled for voice call over the Internet. Similarly, callee equipment 210 may be one of a wireline telephone, a cellular telephone, or a set of equipment enabled for voice call over the Internet, however, callee equipment 210 does not need to be the same type of equipment as caller equipment 204. Caller equipment 204 sends out a request to callee 112 for a priority indicating call via a signaling channel to caller agent 206 at reference 224. Caller agent 206 identifies the requested callee 112 and contact the callee agent associated with callee 112 at reference 226. Caller agent 206 and callee agent 208 may be switch centers (when the network is a public switched telephone network, PSTN) or mobile switching centers (MSC) (when the network is a mobile network) close to the caller/callee locations and responsible for establishing communication with another party on behalf of the caller/callee. As discussed herein below, caller and callee agents may have additional functions specifically to perform priority indicating call processes. Callee agent 208 signals callee equipment 210 at reference 228 indicating incoming priority indicating call from caller 102 to callee 112. Callee agent 208 also informs caller agent 206 that callee 112 is being alerted at reference 230. Callee equipment 210 then calls callee 112 by playing ringtone to alert callee 112. In one embodiment, the ringtone is a regular ringtone used in a regular telephone call. In another embodiment, a special ringtone is played to indicate that the incoming call is a priority indicating call. While the callee is notified of the incoming priority indicating call, caller agent 206 interacts with caller equipment 204 to establish a voice channel. Caller agent 206 sends a call connection message at reference 202 to caller equipment 204, after caller agent 206 receives the request to callee for a priority indicating call at reference 224. Caller equipment 204 sends back an acknowledgement message to caller agent 206. Afterward, a voice channel between caller 102 and caller agent 206 is established, and caller 102 may start talking in the voice channel.

The voice channel between caller 102 and caller agent 206 is established before a response from the callee 112 is received. The voice channel does not reach callee 112, but enabled a voice mail at caller agent 206 instead. With the voice mail, caller agent may be able to determine whether there is an anomaly about caller 102 at reference 290. The voice-mail-before-callee-becoming-active is advantageous in that it provides needed information for the callee to decide whether to pick up the call or which call to pick up first.

People receive phone calls every day. Some of the calls come at good time—the callee is free to pick them up, whereas some others do not—the callee might be busy and desire not to get disturbed (e.g., in a meeting). In the latter case, a callee oftentimes has a hard time deciding whether to pick up a call or not. If it is nothing important, picking it up is disturbing; but missing an urgent call might lead to unaffordable consequences. This dilemma originates from the fact that the callee could not know the importance or urgency of the call—neither the telecom network nor the telephone indicates that. There is no indication in a phone call like the priority flag in an email. The fact that someone is in the address book—or that some number frequently appears on the call log—is not a good indication of how important or urgent a particular call from that person or number is. A more critical decision happens similarly at an emergency call centers (e.g., 911 call centers in the U.S., 112 call centers in the European Union, and 110 call centers in China). Emergency call operators generally pick up the calls in a first-come-first-serve order. Unfortunately, people call emergency numbers for all kinds of reasons, ranging from real emergency like a deadly highway accident to complaints about noises from a partying neighbor. Before picking up the calls and actually talking to the callers, the operators do not have a priori knowledge of which calls are more likely to be urgent and better be taken care of immediately. This problem again is because of lack of information about an incoming call before the call is picked up.

Voice mail at the callee side after waiting for expiration of a callee response does not solve the problem of not knowing the urgency of an incoming call. In prior art, if a callee makes the decision not to pick up an incoming call, the caller will be directed to the callee's voice mailbox and prompted to leave a voice message. As a consequence, the callee will receive a notification on her telephone indicating the reception of a new voice mail. When the callee chooses to listen to the voice mail, the phone may (1) playback the voice mail stored in local memory if it is a landline phone, (2) call the voice mail number of the telecom operator, or (3) streams the voice mail stored in a cloud server if it is a smart phone with appropriate app support. In the above cases (1) and (2), the callee will have to listen to the voice mail to be able to tell whether a call was important or urgent. In the case (3), if the voice mail has been transcribed to text, the recipient can read the text to understand its importance/urgency. Certain keywords can be pre-specified to match against the transcribed text and determine the priority of a voice mail, by which the voice mail will be marked and sorted. However, the accuracy of the transcript could be low, especially when the voice mail contains unrecognized slangs, or the caller has heavy accent or speaks in hard-to-recognized foreign languages. In addition, when the content of voice mails is inspected, the privacy of both the caller and the callee is comprised.

The priority indicating call in embodiments of the invention utilizes voice-mail-before-callee-becoming-active. The resulting voice mail can be used to detect the sentiment of the caller based on acoustic analysis of caller's voice in the voice mail at the caller agent side. The detected sentiment of the caller can then be sent to the callee indicating the likelihood of urgency of the incoming priority indicating call. The detail of acoustic analysis will be discussed in detail herein below.

Referring back to FIG. 2, while waiting for callee 112 to answer the call at box 240, anomaly indication is forwarded from the caller agent 206 to callee 112. Box 240 represents the period after playing ringtone to alert callee at reference 232 and before callee answers at reference 252. When an anomaly is detected at caller agent 206, it sends out a special alert message indicating the anomaly at reference 242 to callee agent 208. Callee agent 208 in turn sends a special alert message indicating anomaly at reference 244 to callee equipment 210. Then callee equipment 210 sends an anomaly alert at reference 246 to callee 112.

Once callee 112 sees the anomaly alert, it may answer the call at reference 252 by interacting with callee equipment 210. The answer to callee equipment 210 causes callee equipment 210 sends a call connection message 254 to callee agent 208. Callee agent 208 acknowledges the call connection message to callee equipment 210 at reference 256. Callee agent 208 also sends a connection message 260 to caller agent 206. Then the voice channel between caller agent 206 and callee 112 is established. Thee voice channel then will be integrated with voice channel between caller 102 and caller agent 206 so that the voice channel between caller 102 and callee 112 is established and caller 102 and callee 112 will be able to speak. When callee 112 does not answer, the ringtone alerting callee 112 at reference 232 will continue until a pre-set timer expires. Note the pre-set timer for a priority indicating call may be different from a regular call. For example, the pre-set timer may be prolonged when anomaly is detected. After the pre-set timer expires, the voice mail resulting from the voice channel between the caller 102 and caller equipment 204 will be sent to be associated with callee 112. For example, a voice mail associated with callee 112 may be formed at callee agent 208, at callee equipment 210, or a location at a cloud server where callee 112 may be able to retrieve. The voice mail associated with callee 112 may have anomaly indication when an anomaly has been detected at reference 290. The anomaly indication will aid callee 112 to sort and prioritize which voice mails to listen first.

Figure 3:
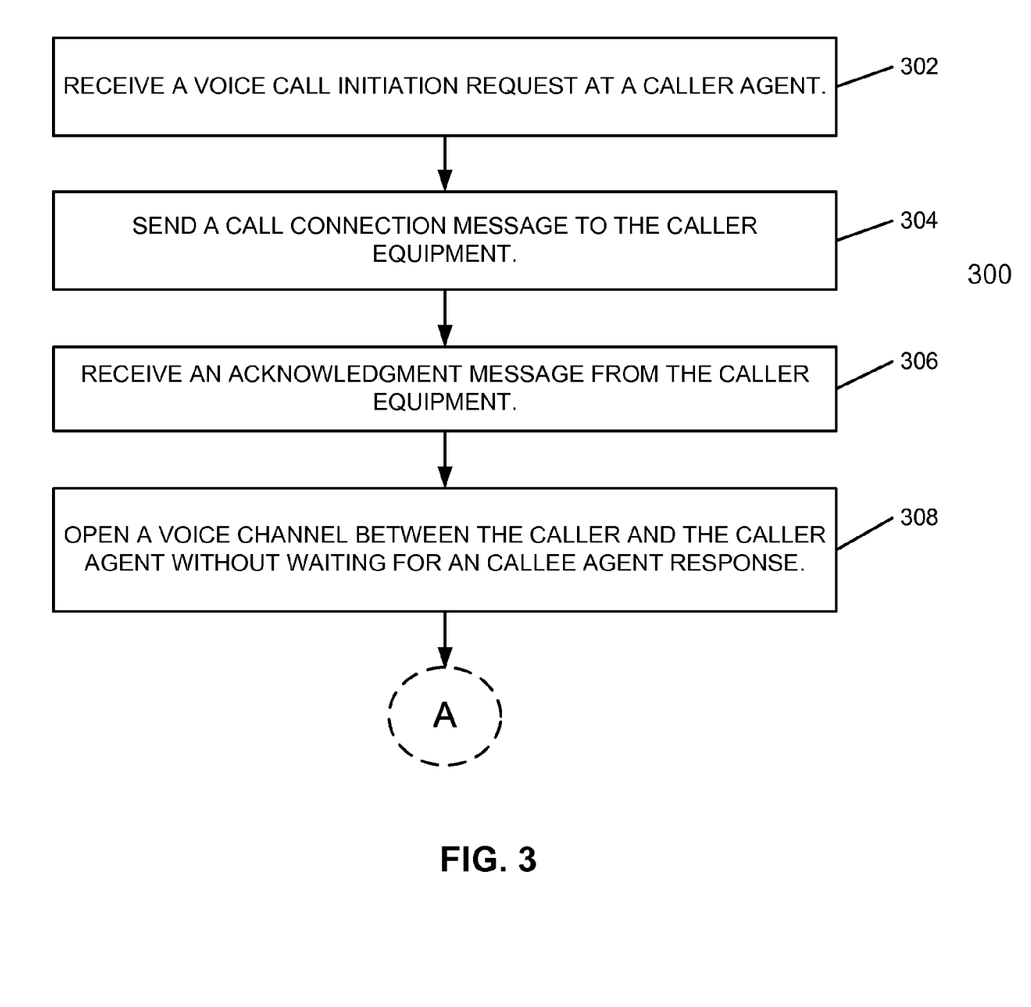
FIG. 3 is a flow diagram illustrating a priority indicating call process according to one embodiment of the invention.

FIG. 3 is a flow diagram illustrating a priority indicating call process according to one embodiment of the invention. The process may be implemented at a caller agent like caller agent 206. At block 302, a voice call initiation request is received at a caller agent. In one embodiment, the voice call initiation request is a call pattern including a number representing the callee and a set of one or more additional characters. The call pattern allows a caller to select whether or not to enable a priority indicating call. The caller may make the selection based on a variety of factors, for example, the urgency of the telephone call or the likelihood of the callee knowing the urgency of the telephone call. In another embodiment, the voice call initiation request is just a number representing the callee, for example, the telephone number of the callee. In this embodiment, the priority indicating call is enabled by default. The default setting may be useful when the caller is a person that likely needs constant help, for example, outpatients, minors, or seniors. At block 304, a call connection message is sent to the caller equipment to acknowledge receiving the voice call initiation request. Then an acknowledgement from the caller equipment is received at block 306. After the handshake between caller equipment and caller agent at blocks 304 and 306, a voice channel is established between the caller and the caller agent without waiting for a callee agent response at block 308. In one embodiment, the process continues at circle A, which is the starting point of FIG. 4.

Figure 4:
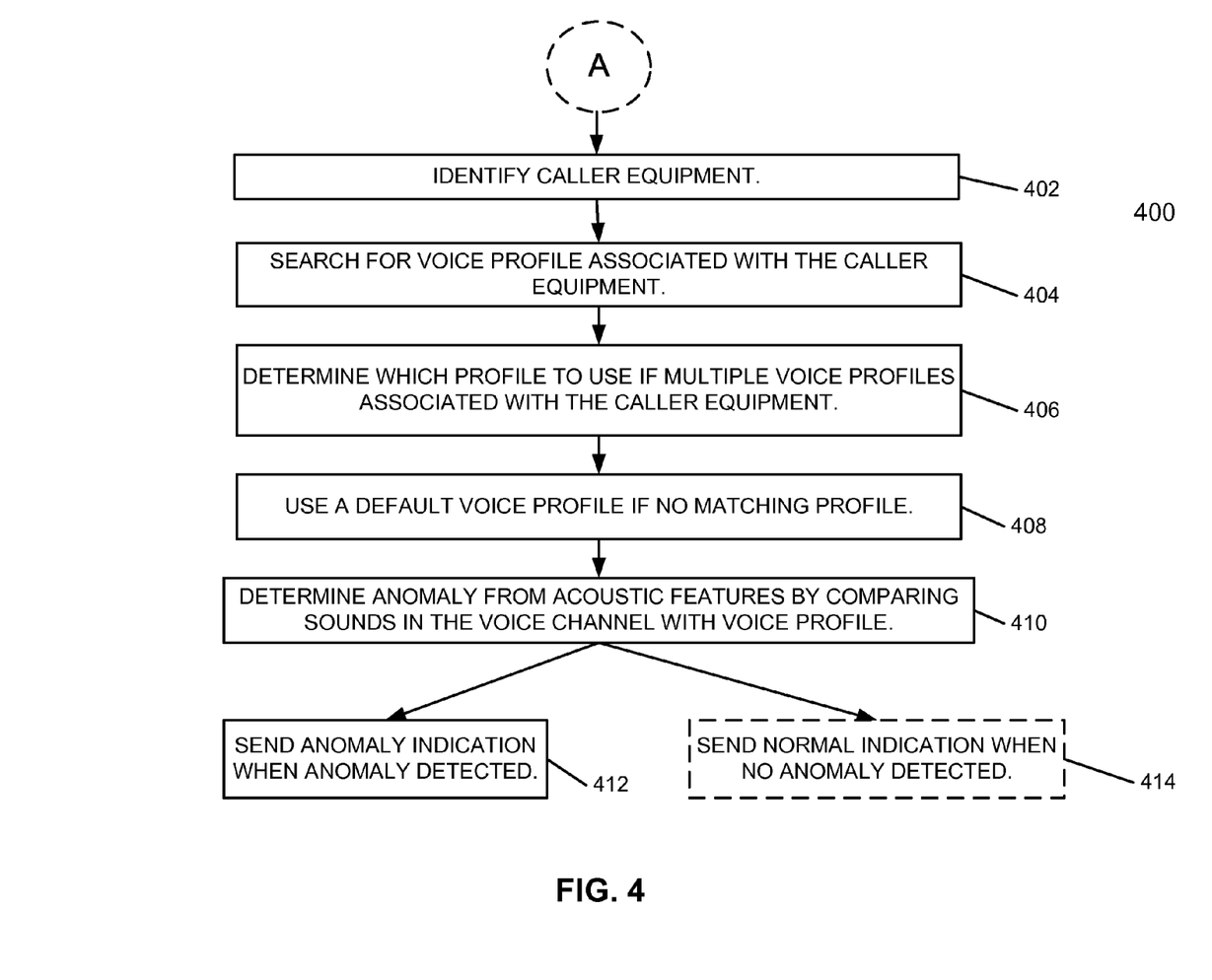
FIG. 4 is a flow diagram illustrating an anomaly detection process according to one embodiment of the invention.

FIG. 4 is a flow diagram illustrating an anomaly detection process according to one embodiment of the invention. The process may be implemented at a caller agent like caller agent 206. The process starts after a voice channel between the caller and the caller agent is established without waiting for a callee agent response in one embodiment. At block 402, a caller equipment is identified. The caller equipment is identified from a message from the caller equipment, for example, a voice call initiation request from the caller equipment can be used to identify the caller equipment at the caller agent. After the caller equipment is identified, the process searches for a voice profile associated with the caller equipment at block 404. In some embodiments, a voice profile—caller equipment association follows an identifier of a caller equipment instead of caller equipment itself. The identifier of a caller equipment can be, for example, a caller phone number or a web identity of an Internet-based telephony service. When a caller changes his/her caller phone number or web identity, the voice profile follows the new caller phone number or web identity. The association to identifier of a caller equipment is useful when the caller upgrades/replaces/switches his/her caller equipment—for example, moving a subscriber identity module (SIM) card from one caller equipment to another caller equipment. A voice profile may be a machine learning model (coefficients in a mathematical formula) that captures acoustic features extracted from previous telephone calls originated from the caller equipment. The voice profile depicts the way a person typically speaks (e.g., volume, pace, tone, intensity, pitch, jitter, and etc.), and it is personalized as each person speaks in different ways. Note that voice profile only extracts acoustic features from previous telephone calls and it does not contain contents from the previous telephone calls. This is an important distinct from prior art where transcripts text from a telephone call is used to determine priority of a telephone call as acoustic features do not invade the caller's privacy while searching through transcripts text would. At block 406, the process determines which voice profile to use if there are multiple voice profiles associated with the caller equipment. This happens when multiple people use the same caller equipment, for example, a residential phone may be used by multiple people in the same household. Clustering algorithms that are known to the persons skilled in the art may be used to detect different voices (e.g., distinguishing between a twenty-year-old girl from a fifty-year-old man). From clustering, the correct voice profile may be selected from multiple voice profiles for the anomaly detection. If no matching profile is found at blocks 404 and 406, a default voice profile may be used for anomaly detection at block 408. A default profile is built from acoustic features extracted from voices of someone other than the caller, for example, an average male or an average female. The default profile may be the starting point for any voice mail when there is no prior known voice profile associated with the caller equipment or the caller. For example, a default voice profile may be used for a male and another default voice profile for a female, and the default voice profiles then are adjusted based on the voice in the voice channel.

At block 410, the process determines whether anomaly exists based on acoustic features of the voice within the established voice channel and a selected voice profile stored in a voice profile repository. The determination may be made based on detecting a mode difference between the extracted acoustic features of the voice within the established voice channel and those of the selected voice profile. Outliner detection techniques that are known to the skilled in the art may be utilized to detect the probability of the acoustic features of the voice being an anomaly. Predefined threshold values can be used to determine whether the acoustic features of the voice indicates an anomaly as well as the level of abnormity. If an anomaly is found, an anomaly indication is sent out at block 412. Optionally, if no anomaly is detected, a normal indication is sent out at block 414.

Figure 5:
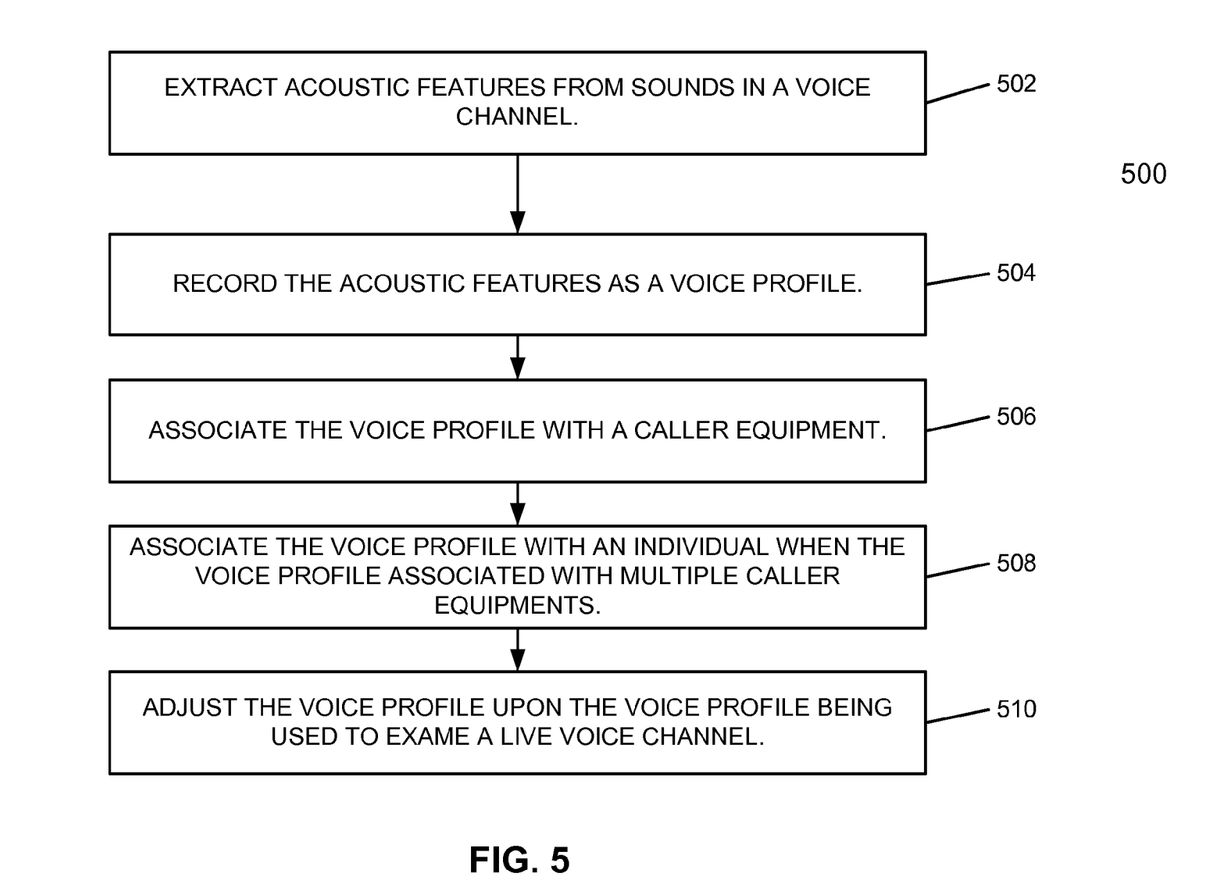
FIG. 5 is a flow diagram illustrating establishing of a voice profile process according to one embodiment of the invention.

FIG. 5 is a flow diagram illustrating establishing of a voice profile process according to one embodiment of the invention. The process starts at extracting acoustic features from sounds in a voice channel at block 502. The process needs to know the identity of the speaker uttering the sounds. With the knowledge, the process records the extracted acoustic features as a voice profile of the speaker at block 504. The voice profile is then associated with a caller equipment at block 506. Since the voice channel is already known at block 502, the caller equipment should be known too at block 506. When the voice profile is associated with multiple sets of caller equipment, then the voice profile is made to be associated with an individual at block 508. The rationale is that when a voice profile is associated with multiple sets of caller equipment, the caller likely has access to multiple sets of caller equipment. Establishing a voice profile independent from a particular caller equipment may help fine tune the efficiency of the voice profile in the future. Then the voice profile is adjusted when the voice profile is used to examine a live voice channel at block 510. A voice profile may not be static and it needs to be updated to reflect the latest acoustic features associated with a caller equipment or a caller. For example, acoustic features associated with a caller may change as the caller ages or the caller recovers from a chronic decease. The voice profile associated with a caller and caller equipment needs to be adjusted to match the latest acoustic features associated with the caller equipment or the caller.

Figure 6:
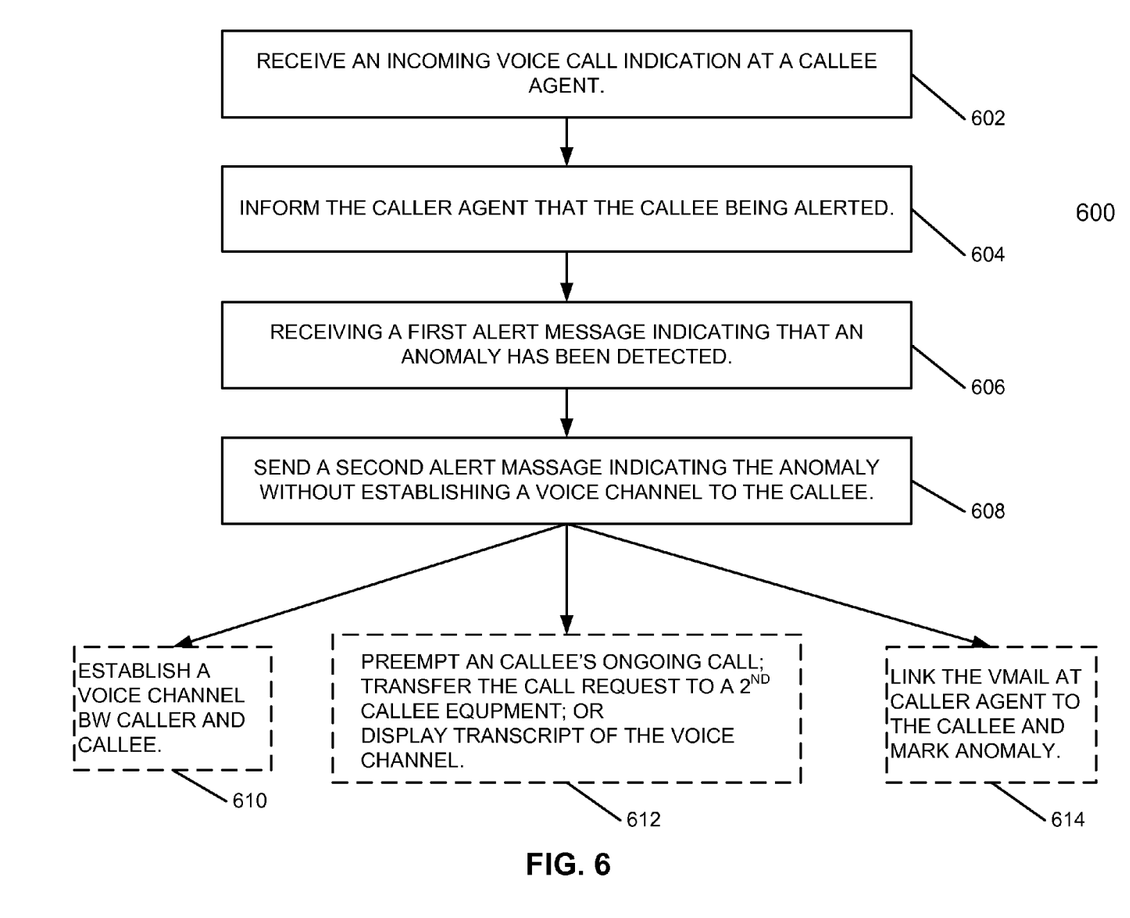
FIG. 6 is a flow diagram illustrating a process of sending anomaly indication according to one embodiment of the invention.

FIG. 6 is a flow diagram illustrating a process of sending anomaly indication according to one embodiment of the invention. The process starts at block 602, where an incoming voice call indication is received at a callee agent. In one embodiment, the incoming voice call indication comes from a caller agent, after the caller agent receives a voice call initiation request from a caller equipment that indicates the call is for a callee equipment communicatively coupled with the callee agent. After receiving the incoming voice call indication, the callee agent may call the callee equipment, and the callee equipment in turn plays ringtone to alert the callee. At block 604, the callee agent informs the caller agent that the callee has been alerted. Then at block 606, the callee agent receives a first alert message indicating that an anomaly has been detected. In one embodiment, the anomaly is detected at the caller agent when the anomaly is detected upon comparing extracted acoustic features from a voice channel established between the caller equipment and the caller agent. At block 608, the callee agent sends out a second alert message indicating the anomaly without establishing a voice channel to the callee. In one embodiment, the second alert message sends only to the callee equipment. In another embodiment, the callee agent sends the second alert message to another callee equipment associated with the callee. For example, the caller may call a wireline telephone (a first callee equipment) and send out a first alert message, once the callee agent receives the first alert message indicating that an anomaly has been detected. In addition, the caller may also send a second alert message indicating the anomaly to a cellular telephone of the caller (a second callee equipment). By reaching multiple sets of callee equipment with the anomaly indication, the method increases the likelihood that the callee is notified of the urgency of the incoming priority indicating call.

After the second alert message is sent to a callee equipment, the callee may answer the priority indicating call in one embodiment. When the callee answers the call, a voice channel is established between the callee equipment and the caller agent, and then the voice channel is integrated with the voice channel that has already been established between the caller agent and the caller equipment at block 610.

In another embodiment, the callee does not answer the priority indicating call. The callee agent may be configured to escalate based on the anomaly at block 612. The callee agent may be configured to preempt an ongoing voice call involving the callee. That is, if the callee is talking on the callee equipment, the callee agent may interrupt the call and switch in the call when the anomaly indicates an emergency. The callee agent may also transfer the voice call initiation request to a second callee equipment associated with the callee. Instead of sending an anomaly indication to a second callee equipment, the callee agent may be configured to transfer the voice call initiation request to the second callee equipment so that the caller can answer the priority indicating call using the second callee equipment. In alternative, the callee agent may be configured to display transcript from the voice channel between the caller and the caller agent when the callee equipment is enabled for the function. Transcript display has been enabled for cloud based voice mail and voice call, and it may become available for wireline and cellular caller equipment. The display of transcript allows the callee to have a direct and visual knowledge of the substance of the urgency conveyed by an anomaly indication. One or more of the options may be selected by the callee agent, and the callee agent may be configured by an administrator of the callee agent or a callee which option should be used and the order of options to perform when multiple options are performed.

In another embodiment, the callee does not answer the priority indicating call and callee agent's escalation is ignored. The callee agent may execute block 614. The voice channel established between the caller and the caller agent enabled a voice mail at caller agent. When the callee does not answer and the caller completes the telephone call at the established voice channel, the voice mail will be linked to the callee at the callee agent. An anomaly indication is marked when an anomaly is detected at the caller agent.

Note that the alert message received and sent by the callee agent may carry multiple level of priority. In other words, anomaly indication may carry more than two values of normal and abnormal. An alert message may indicate low priority, normal, priority, high priority, and critical. A caller agent and callee agent may be configured to handle higher priority calls differently. For example, in block 612, a "critical" priority indicating call may trigger preempt a callee's ongoing call while a "high priority" priority indicating all may trigger only display transcript of the established voice channel.

Also note that a callee agent can process a priority indicating call when no anomaly is indicated. When there is no anomaly detected from the voice channel between the caller equipment and the caller agent, the callee agent may receive out a normal indication to the callee agent (instead of a first alert message indicating anomaly at block 606). Or the callee agent receives no indication about either anomaly or normal. In both cases, the callee agent handles the priority indicating call without anomaly indication as a regular call to the callee, and same and similar procedures of prior art illustrated in FIG. 1 will be followed.

Figure 7:
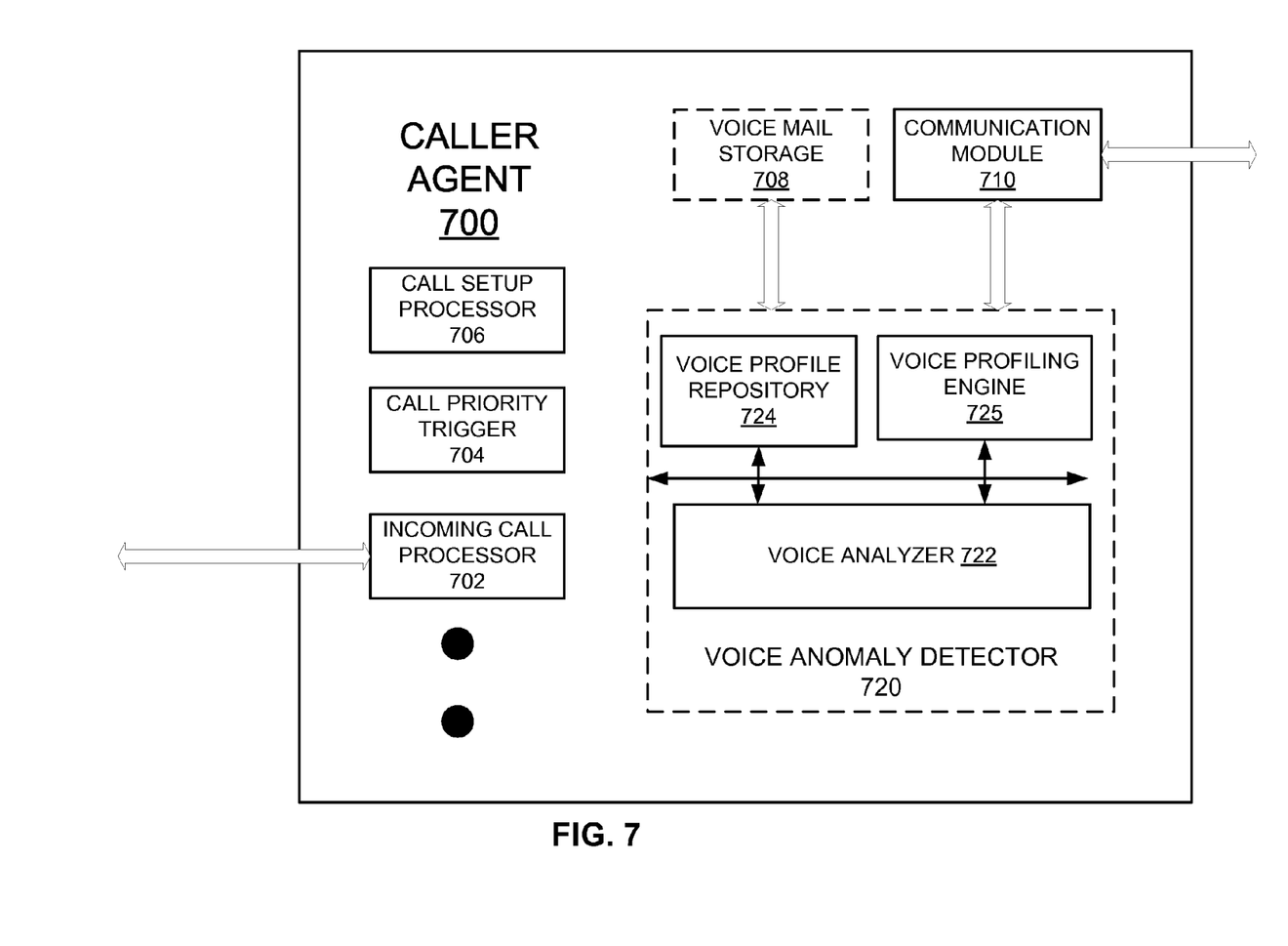
FIG. 7 is a block diagram illustrating one embodiment of a network element serving as a caller agent according to one embodiment of the invention.

FIG. 7 is a block diagram illustrating one embodiment of a network element serving as a caller agent according to one embodiment of the invention. A caller agent may be a switch center (when the network is a public switched telephone network, PSTN) or a mobile switching center (MSC) (when the network is a mobile network) close to the caller locations and responsible for establishing communication with another party on behalf of the caller. Caller agent 700 comprises an incoming call processor 702 that communicates with caller equipment and receives voice call initiation requests. The voice call initiation requests include both for regular voice calls and priority indicating calls. Caller agent 700 also comprises a call priority trigger 704 that triages incoming call and determine whether or not the incoming call is a priority indicating call. Caller agent 700 comprises communication module 710 configured to communicate with sets of caller equipment and call setup processor 706 configured to set up a voice channel between a caller and caller agent 700. Note that communication module 710 also communicates with callee agents to set up voice channel to callees and sends out an anomaly indication once it receives an anomaly indication from voice anomaly detector 720.

Voice anomaly detector 720 extracts sounds from a voice channel established between a caller and caller agent 700. Voice anomaly detector 720 is a part of caller agent 700 in one embodiment. In another embodiment, voice anomaly detector 720 is outside of caller agent 700 and only communicatively coupled with caller agent 700. Voice anomaly detector 720 comprises voice analyzer 722, voice profile repository 724, and voice profiling engine 725. Voice analyzer 722 extracts acoustic features of sounds in a voice channel between a caller and a caller agent and analyzes the sounds. Voice profile repository 724 stores voice profiles (e.g., machine learning models and their coefficients) along with their mapping with associated caller or caller equipment identifications. It exposes interfaces which may be used to look up the corresponding voice profiles given a caller identification or a caller equipment identification. Voice profiling engine 725 executes clustering and machine learning algorithms. It takes acoustic features extracted by voice analyzer 722 and pointers to relevant existing voice profiles at voice profile repository 724 and performs several tasks based on the inputted acoustic features: (1) determining the most appropriate voice profile to use out of all associated with a particular caller equipment or a particular caller; (2) detecting whether and how much sounds in a voice channel is an anomaly using outlier detection algorithms; (3) learning from the sounds in a voice channel and adjust machine learning coefficients for better profiling the sounds in a voice profile associated with the caller or caller equipment. The results of anomaly detection by voice profiling engine 725 are then used to determine if the incoming call is low priority, normal, priority, high priority, or critical. The priority indications from voice anomaly detector 720 are then sent to communication module 710 so that caller agent 700 is aware of the anomaly and may communicate to callee agent and other network elements accordingly. The priority indications can also be sent to voice mail storage so that voice mails can be marked with priority as discussed herein below.

Voice mail storage 708 contains a database to store voice mails. Voice mail storage 708 is a part of caller agent 700 in one embodiment. In another embodiment, voice mail storage 708 is outside of caller agent 700 and only communicatively coupled with caller agent 700. Voice mail storage 708 stores voice mails, e.g., the wave sounds and optionally transcribed texts left for callees. In one embodiment, voice mails are marked with metadata field such as caller/callee identification, call time, call duration and etc. In another embodiment, voice mails are marked additionally with priorities as indicated by voice anomaly detector 720.

In one embodiment, caller agent 700 receives a voice call initiation request at incoming call processor 702. The voice call initiation request is triggered by a caller initiating a voice call via a caller equipment, where the voice call is destined to a callee equipment communicatively coupled with the network to reach a caller, and where the caller agent and a callee agent interact with the caller equipment and the callee equipment respectively. Communication module 710 is configured to send a call connection message to the caller equipment. Communication module 710 is also configured to receive an acknowledgment from the caller equipment. Once the acknowledgment is received from the caller equipment, call setup processor 706 is configured to open a voice channel between the caller and the caller agent without waiting for a callee agent response.

In one embodiment, after call processor 702 receives a voice call initiation request, it passes the request to call priority trigger 704, where calling pattern of the voice call initiation request is examined. Call priority trigger 704 determines whether the calling pattern matches predetermined pattern associated with a priority indicating call, either a call pattern including a number representing a callee and a set of one or more additional characters, or the call pattern is only a number representing a callee but the call is from a call equipment enabled priority indicating call by default. If it is determined that the voice call initiation request is for a priority indicating call, after call setup processor 706 sets up a voice channel between the caller and the caller agent, call priority trigger 704 will interact with voice anomaly detector 720 to detect whether or not the sounds in the voice channel indicates an anomaly. Voice profile repository 724 may contain a number of voice profiles established based on acoustic features extracted from previous voice calls initiated from the caller equipment involved in the voice channel. Voice profile repository 724 may also contain voice profiles established based on acoustic features extracted from voices of someone other than the caller that are used when no match can be found between voice profiles within voice profile repository 724 and the acoustic features extracted from the voice channel (i.e., default voice profiles). In addition, multiple voice profiles within voice profile repository 724 may be associated with the caller equipment involved in the voice channel. For example, when the caller equipment is a residential telephone, multiple persons may use the caller equipment thus multiple voice profiles should be associated with the caller equipment. In addition, a voice profile within voice profile repository 724 may be associated with multiple sets of caller equipment. For example, a caller may have multiple sets of caller equipment, thus instead of associating voice profiles only with a particular caller equipment, a voice profile should be able to be associated with multiple sets of caller equipment. Voice analyzer 722 extracts acoustic features of sounds in the voice channel between the caller and caller agent 700 and analyzes the sounds. The result of the analysis is sent to voice profiling engine 725. Voice profiling engine 725 takes acoustic features extracted by voice analyzer 722 and pointers to relevant existing voice profiles at voice profile repository 724, and executes clustering and machine learning algorithms. Voice profile engine 725 then determines the most appropriate voice profile to use out of all associated with the particular caller equipment or the particular caller. Voice profile engine 725 also detects whether sounds in the voice channel has an anomaly using algorithms like outlier detection. In addition, voice profile engine 725 learns from the sounds in the voice channel and adjusts machine learning coefficients for better profiling the sounds in a voice profile associated with the caller or caller equipment. If voice profile engine 725 detects an anomaly in the voice channel, a determination is then made on whether the incoming call is low priority, normal, priority, high priority, or critical. The priority of the incoming call is sent to communication module 710. If the priority is low or normal, a normal indication may be sent to the callee agent. If the priority is one of priority, high priority, or critical, an anomaly indication is sent to the callee agent. If the callee does not answer the call, the voice channel will be terminated once the caller finishes talking, and the detected priority may be attached to the formed voice mail at voice mail storage 708.

Figure 8:
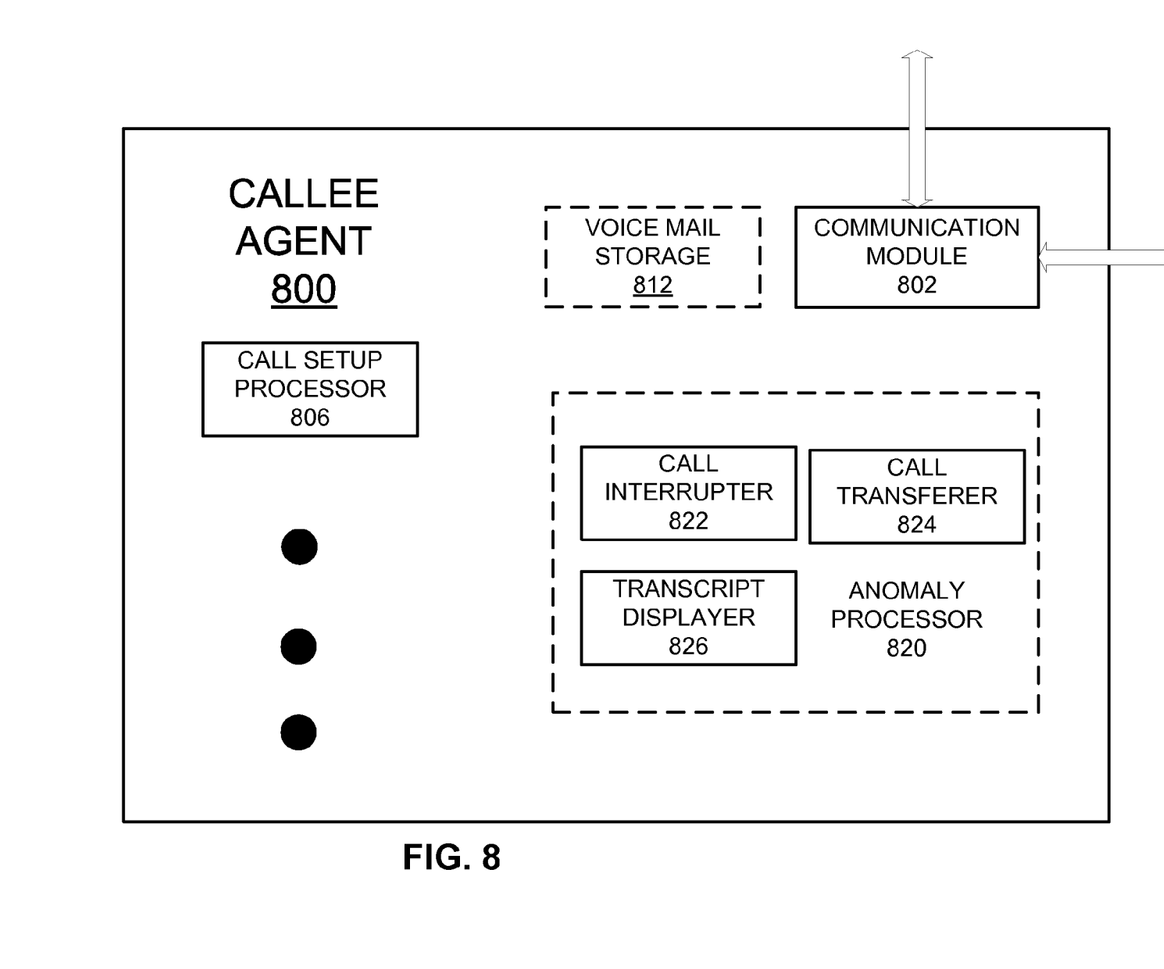
FIG. 8 is a block diagram illustrating one embodiment of a network element serving as a callee agent.

FIG. 8 is a block diagram illustrating one embodiment of a network element serving as a callee agent according to one embodiment of the invention. A callee agent may be a switch center (when the network is a public switched telephone network, PSTN) or a mobile switching center (MSC) (when the network is a mobile network) close to the callee locations and responsible for establishing communication with another party on behalf of the callee. Callee agent 800 comprising a communication module 802 configured to communicate with caller agents, sets of callee equipment, and other network elements. Callee agent 800 also comprises call setup processor 806 configured to set up a voice call between a callee and a caller once the callee answers a call. Optionally, call agent 800 also comprises anomaly processor 820. Anomaly processor 820 includes at least one of call interrupter 822 configured to interrupt an ongoing call involving a callee, call transferer 824 configured to forward a call request to a callee equipment different from the callee equipment specified from an incoming call, and transcript displayer 826 configured to display transcript of a voice channel established between a caller and a caller agent. Optionally, callee agent 800 may further include voice mail storage 812. Voice mail storage 812 is a part of callee agent 800 in one embodiment. In another embodiment, voice mail storage 812 is outside of caller agent 800 and only communicatively coupled with caller agent 800. Voice mail storage 812 stores voice mails, e.g., the wave sounds and optionally transcribed texts left for callees. In one embodiment, voice mails are marked with metadata field such as caller/callee identification, call time, call duration and etc. In another embodiment, voice mails are marked additionally with priorities.

In one embodiment, communication module 802 receives a voice call initiation request, where the voice call initiation request is triggered by a caller initiating a voice call via a caller equipment, where the voice call is destined to a callee equipment communicatively coupled with the network to reach a caller, and where the caller agent and a callee agent interact with the caller equipment and the callee equipment respectively. Communication module 802 then informs the caller agent that the callee being alerted once it alerts the callee equipment of the incoming voice call initiation request. Communication module 802 then receives a first alert message indicating an anomaly has been detected, and it sends out a second alert message indicating the anomaly without establishing a voice channel to the callee. If the callee answers the call, call setup processor 806 sets up a voice channel between the callee and the caller, integrating a voice channel established between the caller and caller agent. If the callee does not answer the call, anomaly processor 820 decides how to proceed depending on configuration. Anomaly processor 820 may activate call interrupter 822 to interrupt an ongoing call involving the callee that the call is routing to, it may activate call transferer 824 to forward the voice call initiation request to a callee equipment different from the callee equipment specified from the incoming voice call initiation request, and it may also activate transcript displayer 826 to display transcript of the voice channel established between the caller and the caller agent. If the caller still cannot be reached, callee agent 800 may link the voice mail resulting from the caller and the caller agent to the callee, and it may further tag the voice mail with priority indication received from the first alert message along with metadata field such as caller/callee identification, call time, call duration and etc.

Figure 9:
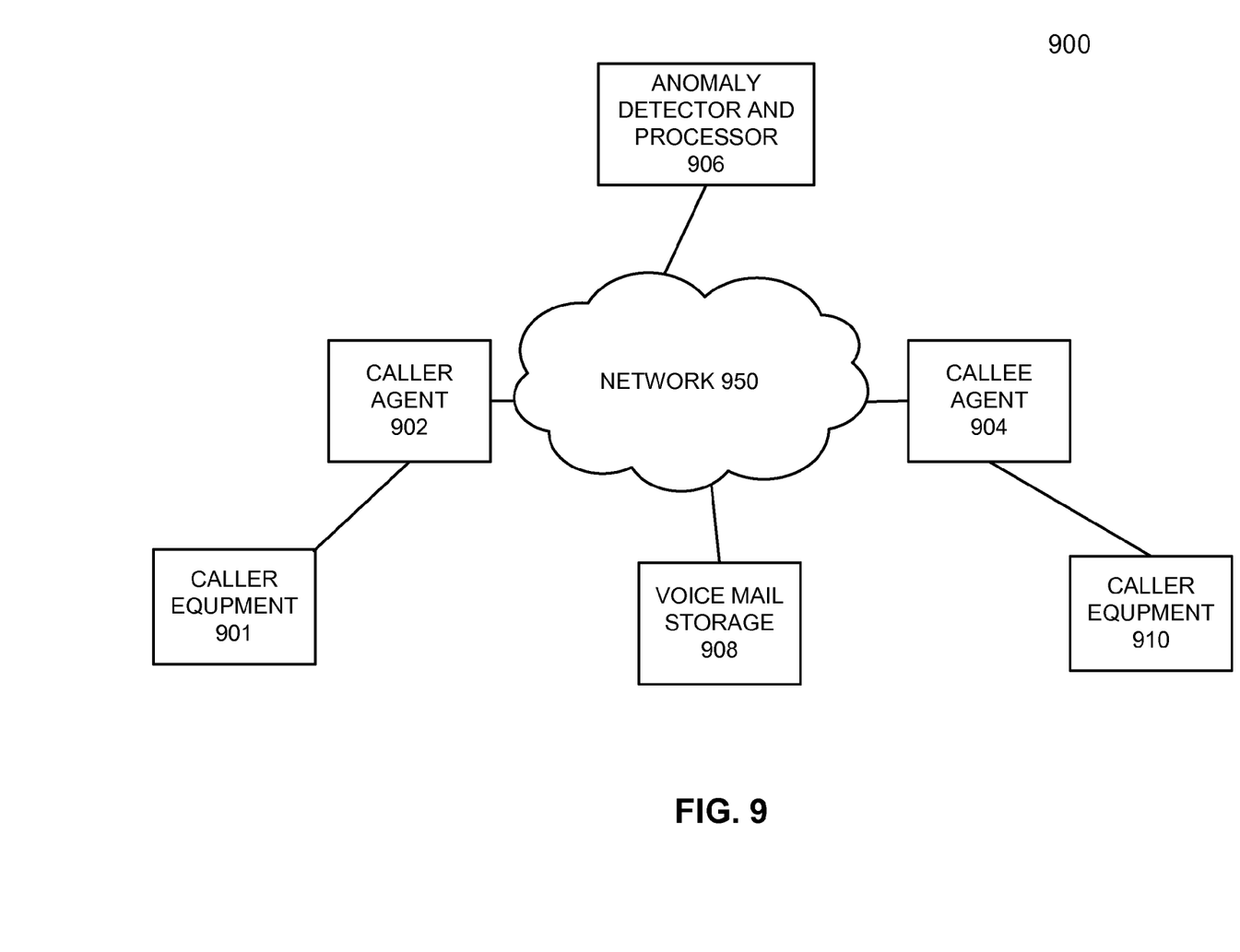
FIG. 9 is a block diagram illustrating call process according one embodiment of the invention.

FIG. 9 is a block diagram illustrating call process according to one embodiment of the invention. In system 900, caller equipment 901 is the caller equipment a caller interacts with. Caller equipment 901 interacts with caller agent 902, which is communicatively coupled with network 950. Network 950 may be a PSTN, a mobile network, or an Internet cloud when the calling parties are Internet devices. Similarly, callee equipment 910 is the callee equipment a callee interacts with and callee equipment 910 interacts with callee agent 904. Voice storage is a standalone device, and it interacts with both caller agent 902 and callee agent 904 for voice mail process. In addition, anomaly detector and processor 906 is communicatively coupled with both caller agent 902 and callee agent 904. Anomaly detector and processor 906 may be configured to have the functionality of both voice anomaly detector 720 as illustrated in FIG. 7 and anomaly processor 820 as illustrated in FIG. 8. The functionalities of both units are discussed herein above. One of the advantage of having a separate voice storage 908 and anomaly detector and processor 906 is that the existing caller agent and callee agent do not need to be changed. As discussed herein above, the functionality of caller agent and callee agents generally are in switch centers in a PSTN network and mobile switch center in a mobile network, upgrading them to include priority indicating call may take some resources and separate voice storage and anomaly detector outside of caller agent and callee agents may make adding priority indicating call functionality easier.

Figure 10:
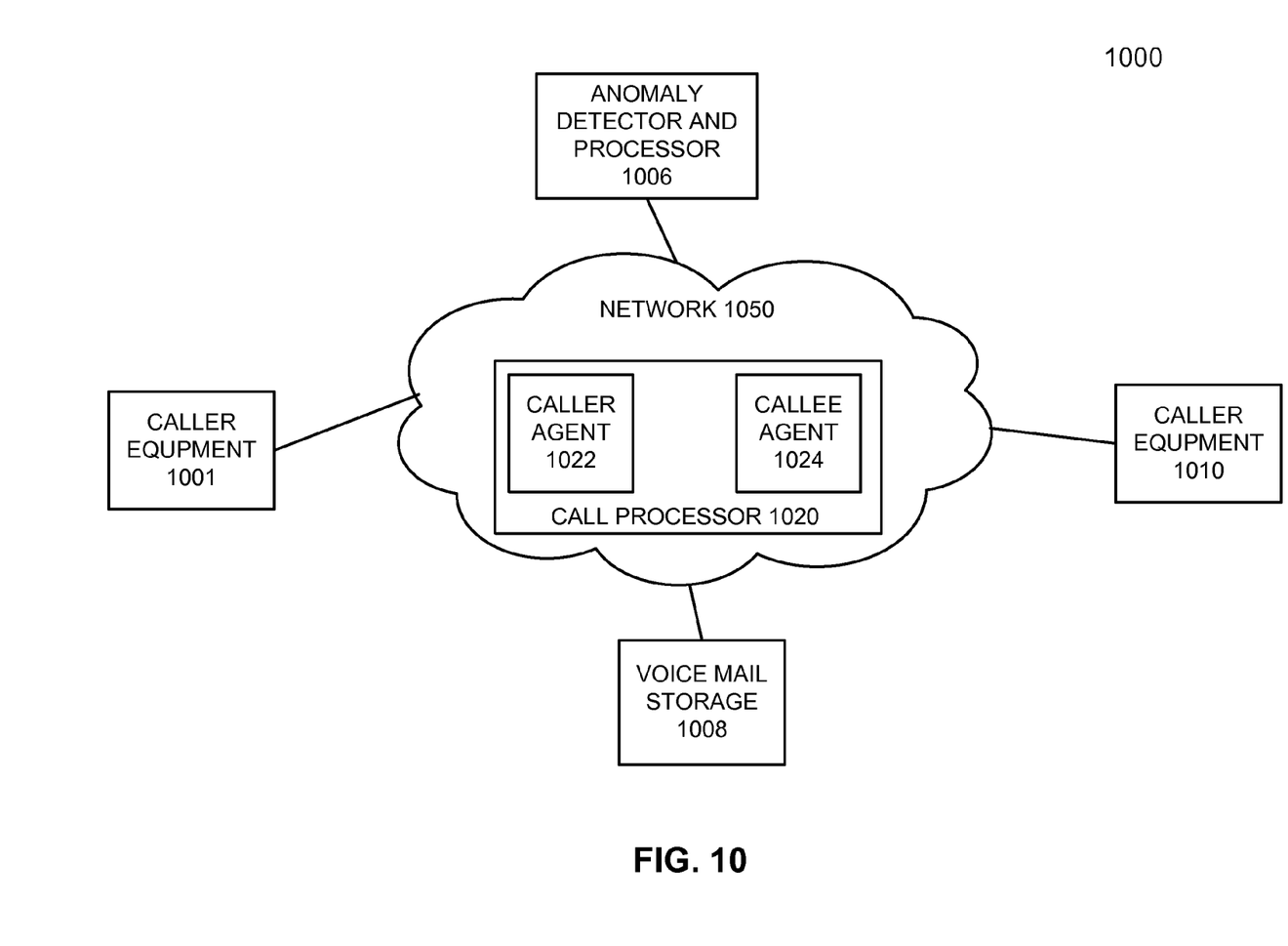
FIG. 10 is another block diagram illustrating call process according one embodiment of the invention.

FIG. 10 is a block diagram illustrating call process according another embodiment of the invention. System 1000 is similar to system 900 and same or similar references indicate elements or components having the same or similar functionalities. One main difference is that caller agent 1022 and callee agent 1024 are integrated in call processor 1020. Callers and callees are relative terms in telephone calls—a caller will be a callee in a different call. Thus a network element within a network generally has to have the functionality of both caller and callee. Thus, in some embodiment, one caller processor will function as both caller agent and callee agent.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method to provide voice calls in a network, the method comprising:
   receiving a voice call initiation request at a caller agent, wherein the voice call initiation request is triggered by a caller initiating a voice call via a caller equipment, wherein the voice call is destined to a callee equipment communicatively coupled with the network to reach a caller, wherein the caller agent and a callee agent interact with the caller equipment and the callee equipment respectively, and wherein the voice call initiation request is one of:
      a call pattern including a number representing the callee and a set of one or more additional characters, and
      a number representing the callee;
   sending a call connection message to the caller equipment;
   receiving an acknowledgment message from the caller equipment; and
   opening a voice channel between the caller and the caller agent without waiting for a callee agent response.

2. The method of claim 1, further comprising:
   comparing sounds in the voice channel with a stored voice profile to detect an anomaly; and
   sending an anomaly indication when the anomaly is detected.

3. The method of claim 2, wherein the stored voice profile is established based on one of the following:
   acoustic features extracted from voices of someone other than the caller; and
   acoustic features extracted from previous voice calls initiated from the caller equipment.

4. The method of claim 2, wherein the stored voice profile is one of a plurality of voice profiles associated with the caller equipment.

5. The method of claim 2, wherein the stored voice profile is associated with more than one caller equipment.

6. The method of claim 2, further comprising sending a normal indication when no anomaly is detected.

7. The method of claim 1, further comprising saving sounds of the voice channel to a voice mail associated to the callee.

8. A method to provide voice calls in a network, the method comprising:
   receiving an incoming voice call indication at a callee agent, wherein the incoming voice call indication is triggered by a caller initiating a voice call via a caller equipment, wherein the voice call is destined to a first callee equipment communicatively coupled with the network to reach a caller, and wherein a caller agent and the callee agent interact with the caller equipment and the first callee equipment respectively to establish a voice call between the caller and the callee;
   informing the caller agent that the callee being alerted;
   receiving a first alert message indicating an anomaly has been detected; and
   sending a second alert message indicating the anomaly without establishing a voice channel to the callee.

9. The method of claim 8, wherein the second alert message is send to a second callee equipment, wherein the second callee equipment is communicatively coupled with the network, and wherein the second callee equipment is associated with the callee.

10. The method of claim 8, further comprising:
linking a voice mail associated with the incoming voice call to the callee; and
marking the voice mail with an anomaly indication.

11. The method of claim 8, further comprising at least one of the following:
preempting an ongoing voice call involving the callee;
transferring the voice call initiation request to a second callee equipment, wherein the second callee equipment is communicatively coupled with the network, and wherein the second callee equipment is associated with the callee; and
displaying transcript from the voice channel between the caller and the caller agent when the callee equipment is enabled for the function.

12. The method of claim 11, wherein the actions of the callee agent is configurable.

13. The method of claim 8, further comprising establishing a voice channel between the caller and the callee.

14. A network element configured as a caller agent to provide voice calls in a network, the network element comprising:
an incoming call processor configured to receive a voice call initiation request, wherein the voice call initiation request is triggered by a caller initiating a voice call via a caller equipment, wherein the voice call is destined to a callee equipment communicatively coupled with the network to reach a caller, wherein the caller agent and a callee agent interact with the caller equipment and the callee equipment respectively, and wherein the voice call initiation request is one of:
a call pattern including a number representing the callee and a set of one or more additional characters, and
a number representing the callee;
a communication module configured to send a call connection message to the caller equipment, and wherein the communication module is further configured to receive an acknowledgment from the caller equipment; and
a call setup processor configured to open a voice channel between the caller and the caller agent without waiting for a callee agent response.

15. The network element of claim 14, further communicatively coupled with a voice anomaly detector, wherein the voice anomaly detector comprises a voice analyzer configured to compare sounds in the voice channel with a stored voice profile to detect an anomaly and send an anomaly indication when the anomaly is detected.

16. The network element of claim 15, wherein the voice anomaly detector comprising a voice profile repository, wherein the voice profile repository includes a plurality of stored voice profiles, the plurality of stored voice profiles being established based on acoustic features extracted from voices of someone other than the caller and acoustic features extracted from previous voice calls initiated from the caller equipment.

17. The network element of claim 16, wherein the voice profile repository further includes a plurality of voice profiles associated with the caller equipment.

18. The network element of claim 16, wherein the voice profile repository further includes voice profiles associated with more than one caller equipment.

19. The network element of claim 15, wherein the communication module further configured to send a normal indication when no anomaly is detected.

20. The network element of claim 14, further communicatively coupled with a voicemail storage configured to save sounds of the voice channel to a voice mail associated to the callee.

21. A method to provide priority indicating voice calls in a network, the method comprising:
receiving a voice call request containing a callee number at a caller agent, wherein the callee number is dialed by a caller initiating a voice call via a caller phone equipment, wherein the voice call is destined to a callee phone equipment communicatively coupled with the network to reach a caller, and wherein the caller agent and a callee agent interact with the caller phone equipment and the callee phone equipment respectively;
sending a call connection message to the caller phone equipment;
receiving an acknowledgment from the caller phone equipment;
opening a voice channel between the caller and the caller agent without waiting for a callee agent response;
comparing sounds in the voice channel with a stored voice profile to detect an anomaly; and
sending an anomaly indication when the anomaly is detected.

22. A caller agent to provide priority indicating voice calls in a network, comprising:
an incoming call processor configured to receive a voice call initiation request containing a callee number, wherein the voice call initiation request is triggered by a caller dialing a number on a caller phone equipment, wherein the voice call is destined to a callee phone equipment communicatively coupled with the network to reach a caller, and wherein the caller agent and a callee agent interact with the caller phone equipment and the callee phone equipment respectively;
a communication module configured to send a call connection message to the caller phone equipment, and wherein the communication module is further configured to receive an acknowledgment from the caller phone equipment;
a call setup processor configured to open a voice channel between the caller and the caller agent without waiting for a callee agent response; and
a voice anomaly detector, wherein the voice anomaly detector comprises a voice analyzer configured to compare sounds in the voice channel with a stored voice profile to detect an anomaly and send an anomaly indication when the anomaly is detected.

* * * * *